(12) United States Patent
Toye

(10) Patent No.: US 10,136,588 B2
(45) Date of Patent: Nov. 27, 2018

(54) PLANT TREATMENT MATERIAL

(71) Applicant: Nine IP Limited, Rosedale (NZ)

(72) Inventor: Jonathan Dallas Toye, Rosedale (NZ)

(73) Assignee: NINE IP LIMITED (NZ)

(*) Notice: Subject to any disclaimer, the term of this patent is extended or adjusted under 35 U.S.C. 154(b) by 0 days.

(21) Appl. No.: 14/929,690

(22) Filed: Nov. 2, 2015

(65) Prior Publication Data
US 2016/0050858 A1 Feb. 25, 2016

Related U.S. Application Data

(63) Continuation of application No. 13/226,226, filed on Sep. 6, 2011, now abandoned, which is a continuation of application No. 11/572,485, filed as application No. PCT/NZ2005/000182 on Jul. 22, 2005, now abandoned.

(30) Foreign Application Priority Data

Jul. 22, 2004 (NZ) ........................................ 534251

(51) Int. Cl.
*A01G 13/02* (2006.01)
(52) U.S. Cl.
CPC ................................ *A01G 13/0268* (2013.01)
(58) Field of Classification Search
CPC ................................................ A01G 13/0268
USPC ............................ 47/31, 31.1, 32, 20.1, 29.1
See application file for complete search history.

(56) References Cited

U.S. PATENT DOCUMENTS

| 2,601,326 A | | 6/1952 | Rohs et al. | |
| RE23,603 E | | 12/1952 | Rohs et al. | |
| 2,974,442 A | * | 3/1961 | Womelsdorf | ...... A01G 13/0206 47/32 |
| 3,470,928 A | | 10/1969 | Schwartz | |
| 3,482,609 A | | 12/1969 | Neckerman | |
| 3,709,263 A | * | 1/1973 | Jackson | ................. D03D 25/00 139/420 R |
| 3,769,747 A | | 11/1973 | Chapman, Jr. | |
| 3,888,041 A | | 6/1975 | Seith et al. | |
| 4,044,501 A | | 8/1977 | Frydryk | |
| 4,644,684 A | * | 2/1987 | Verbeeck | ........... D03D 15/0088 47/31 |
| 4,794,726 A | * | 1/1989 | Fawcett | ................. A01C 1/044 47/32 |
| 5,033,231 A | * | 7/1991 | Sakate | ................... A01G 1/005 47/56 |

(Continued)

FOREIGN PATENT DOCUMENTS

| EP | 0021467 | 1/1981 |
| GB | 288409 | 4/1928 |

(Continued)

*Primary Examiner* — Kristen C Hayes
(74) *Attorney, Agent, or Firm* — Hovey Williams LLP

(57) ABSTRACT

Described is a reflective ground cover sheet material (1) in which longitudinally extending opposite side margins (A) of the sheet material are stronger than a longitudinally extending center section between the side margins of the material. Also described is a reflective ground cover sheet material (1) having longitudinally extending opposite side margins (A) of the sheet material of lower porosity than a longitudinally extending center section between the side margins of the material.

26 Claims, 7 Drawing Sheets

(56) References Cited

U.S. PATENT DOCUMENTS

| | | | |
|---|---|---|---|
| 5,070,643 A * | 12/1991 | Hinsperger | A01G 13/0268 |
| | | | 428/919 |
| 5,201,497 A | 4/1993 | Williams et al. | |
| 5,288,545 A * | 2/1994 | De Decker | A01G 9/1438 |
| | | | 139/29 |
| 5,605,007 A * | 2/1997 | Hinsperger | A01G 9/14 |
| | | | 47/17 |
| 6,339,898 B1 | 1/2002 | Toye | |
| 6,658,789 B2 * | 12/2003 | Klayman | A01G 13/10 |
| | | | 47/31 |
| 7,207,136 B2 * | 4/2007 | Hinsperger | A01G 13/0268 |
| | | | 47/31 |
| 2004/0118039 A1 * | 6/2004 | Hinsperger | A01G 13/0268 |
| | | | 47/31.1 |
| 2004/0213637 A1 | 10/2004 | Ianniello | |
| 2005/0050793 A1 * | 3/2005 | Johnson | C09K 17/52 |
| | | | 47/9 |

FOREIGN PATENT DOCUMENTS

| | | |
|---|---|---|
| JP | 8-256613 | 10/1996 |
| WO | 98/30082 A1 | 7/1998 |
| WO | 02067661 | 9/2002 |
| WO | 03013223 | 2/2003 |

* cited by examiner

PLANT TREATMENT MATERIAL

RELATED APPLICATION

This application is a continuation of U.S. patent application Ser. No. 13/226,226, filed Sep. 6, 2011, which is a continuation of U.S. patent application Ser. No. 11/572,485, filed May 8, 2007, which is the National Stage of International Application No. PCT/NZ2005/000182 filed Jul. 22, 2005 claiming the benefit of New Zealand Patent Application No. 534251 filed Jul. 22, 2004, the entire disclosures of each of which are hereby incorporated by reference herein.

FIELD OF INVENTION

The invention relates to woven materials and particularly but not exclusively to woven materials for use as ground covers or other agricultural applications.

BACKGROUND

Ground cover materials have been used in agriculture for a number of purposes. These include moisture retention, water conservation, weed or sward suppression, soil warmth retention and for light reflecting.

Typically where the material is used primarily as a reflective ground cover for light enhancement, the material is rolled out in lengths onto the ground between rows of trees in an orchard, rows of vines in a vineyard, or rows of berry fruit plants for example, to increase the amount of light to which the plants and in particular fruit are exposed, by reflection of light from the material towards the fruit above. Each length of the material needs to be suitably secured in place such that it will not be dislodged during wind or movement of traffic over the materials. A fastening system including a multiple number of prong fastening components or "claws" may be fixed to the edges or side margins of the sheet material by pushing the prongs of the fastening components into the material so that prongs pierce and pass through the material. In turn the prongs are fixed to adjacent trees, or alternatively stakes or pegs inserted for that purpose, typically but not necessarily by a length of elastic cord.

The sheet material will typically remain in place for some months, before being removed and reused in a subsequent growing season or on another crop in the same growing season. During the period in which the material is in place fixed to the ground wind may apply substantial loading to the fastening system by which the material is fixed to the ground.

SUMMARY OF INVENTION

In broad terms in one aspect the invention comprises a reflective ground cover sheet material in which longitudinally extending opposite side margins of the sheet material are stronger than a longitudinally extending centre section between the side margins of the material.

Preferably the sheet material is formed from warp and weft tapes of a plastics material.

Preferably the width of the warp tapes is reduced so that the material has a higher density of warp tapes, or the thickness of the warp tapes is increased, in the side margins between the outer edge of the material generally parallel to the warp tapes to about 150-200 mm in from either side edge of the material towards the centre of the material.

Preferably the transition between the reduced width or increased thickness warp tapes at the side margins of the material and the greater width or lower thickness warp tapes is marked by a line or other marking of contrasting colour. Alternatively the colour of all of the reduced width or increased thickness warp tapes may contrast slightly to that of the balance of the sheet material.

Optionally the warp tapes in side margins of the material may be of both greater width and increased thickness than the warp tapes between the side margins of the material.

In broad terms in a further aspect the invention comprises a woven ground cover sheet material woven in which the width of warp tapes is reduced in longitudinally extending opposite side margins of the material relative to the width of warp tapes in a longitudinally extending centre section between the side margins of the material.

In broad terms in a further aspect the invention comprises a woven ground cover sheet material in which the thickness of warp tapes is increased in longitudinally extending side margins of the material relative to the thickness of warp tapes in a longitudinally extending centre section between the side margins of the material. In the material of the invention the side margins of the material, in which the warp tapes are of reduced width and higher density, or are of increased thickness, are stronger than the balance of the material. When the sheet is fixed in place and using a fixing system including prong fastening components or claws, or similar, which pierce through the side margins of the sheeting material, the increased strength of the side margins provides more secure fixing of the material, with reduced risk of tearing or enlargement of the holes formed when the prongs pierce through the material which increases risk of dislodgement of the fastening components. At the same time the major part of the sheet material may be woven with warp tapes, and weft tapes, having a width greater than that of the warp tapes in the side margins, as may be desirable to optimise the tape width for the particular property desired from the ground cover. For example wider tapes may provide higher porosity or ease of movement through the material (see below) to wind, air, dirt, soil and water.

In broad terms in a further aspect the invention comprises a woven ground cover sheet material woven with a tighter weave in longitudinally extending opposite side margins of the material than in a longitudinally extending centre section between the side margins of the material. That is, the width & thickness of the tapes in the side margins of the material may be the same as in the centre section of the material but the weave of the material in the side margins may be tighter to give the side margins increased strength as referred to above.

In broad terms in a further aspect the invention comprises a woven ground cover sheet material in which the chemical composition of warp tapes in longitudinally extending opposite side margins of the material is different to that of warp tapes in a longitudinally extending centre section between the side margins of the material to strengthen the side margins of the material relative to the longitudinally extending centre section of the material, or to increase the resistance of the side margins of the material to strength degradation from exposure to the external environment and/or aging, relative to said longitudinal centre section of the material. In broad terms in another aspect the invention comprises a reflective ground cover sheet material in which longitudinally extending opposite side margins of the material have had applied thereto one or more agents to strengthen the side margins of the material relative to a longitudinally extending centre section of the material, or to increase the resistance of the side margins of the material to strength degradation from exposure to the external environment and/or aging, relative to said longitudinal centre section of the material.

In one form said one or more agents are incorporated in a resin from which warp tapes of a plastics material of the side margins of the material are formed. An increase in resistance of the side margins to strength degradation can come from the type or concentration of light or heat stabilisers used, or by the type of polymer resins or additives to the main polymer resin, for these side margin tapes in the warp direction. Alternatively for example said one or more agents may be sprayed or otherwise overcoated onto the side margins of the material after manufacture of the material.

Preferably said one or more agents includes at least one light or heat stabiliser or processing aids which will increase the resistance of the side margins of the material to degradation through exposure from solar radiation or heat or chemical or environmental degradation in an external environment. Additionally or alternatively said one or more agents include at least one agent which increases the strength of a plastic material from which the side margins are formed. Another agent to increase the strength of the side margin could be the use of different polymers from the main body of the fabric. These polymers could be either on their own or in combination polypropylene, polyester, polyethylene, polyvinyl acetates, low density polyethylene, linear low density polyethylene, ethylene butyl acrylate, ethylene methyl acrylate, polystyrene, styrene-butadiene, acrylonitrile-butadiene-styrene, styrene-acrylonitrile, polyethylene terephthalate, polymethylmethacrylate, polycarbonate, and ethylene alpha-olefm.

In the material of this aspect of the invention the side margins of the material are stronger than the balance of the material, so that when the sheet is fixed in place as referred to previously, the increased strength of the side margins provides more secure fixing of the material with reduced risk of tearing or enlargement, especially when under load, of the holes formed when the prongs pierce through the material. The approach here is to increase the strength of the weakest link of the material that affects its longevity, to give an overall material with a longer life in order to give users a useful choice to extend the life of the material. Alternatively the side margins of the material may have equivalent strength to that of the centre section of the material initially, but the side margins are more slowly degraded from exposure to the external environment such as solar radiation, or from aging generally, and maintain their strength for longer, so that the material will remain securely fixed with reduced risk of tearing or enlargement of the holes formed in the side margins of the material when the prongs pierce through the material, then the material is subjected to wind loading for example. It may also be possible to reuse the material for more subsequent seasons than would otherwise be the case and thus achieve a longer useful life from the material.

In broad terms in a further aspect the invention comprises a reflective ground cover sheet material having longitudinally extending opposite side margins of the sheet material of lower porosity (as herein defined) than a longitudinally extending centre section between the side margins of the material.

In broad terms in a further aspect the invention comprises a ground cover sheet material in which longitudinally extending opposite side margins of the sheet material have a lower porosity (as herein defined) than a longitudinally extending centre section between the side margins of the material.

In broad terms in a further aspect the invention comprises a reflective ground cover sheet material in which longitudinally extending opposite side margins of the sheet material are stronger and have a lower porosity (as herein defined) than a longitudinally extending centre section between the side margins of the material.

In broad terms in a further aspect the invention comprises a woven ground cover sheet material woven in which the width of warp tapes is reduced and the thickness of the warp tapes is increased in longitudinally extending opposite side margins of the material relative to the width of and thickness of warp tapes in a longitudinally extending centre section between the side margins of the material.

In broad terms in a further aspect the invention comprises a reflective ground cover sheet material woven from warp tapes and weft tapes in which the warp and weft tapes have not been folded or twisted during weaving or have been folded or twisted minimally, so that there is not more than one fold or twist per 10 $m^2$ surface area of the material at least in the centre section of the material.

In broad terms in a further aspect the invention comprises a reflective ground cover sheet material in which the transition between an inner edge of each side margins and the centre section of the material is marked by a line or other marking of contrasting colour. In broad terms in a further aspect the invention comprises a reflective ground cover sheet material woven from warp tapes and weft tapes and in which the colour of all of the warp tapes in the side margins contrasts to that of the balance of the sheet material.

In broad terms in a further aspect the invention comprises a reflective ground cover sheet material having a porosity (as herein defined) of at least 2%.

Preferably, the material has a porosity of at least 2%.

Preferably the material has a porosity up to 15%, more preferably 4-12%, even more preferably 5-10%, and most preferably 6-8%.

By "porosity" is meant the percentage of the surface area of the material which is made up of holes or apertures through the material, between spaced apart warp and weft tapes of the material for example, relative to the overall surface area of the material. For example a material having warp and weft tapes spaced apart from each other so that the air space between the warp and weft tapes constitutes 8% per square meter surface area of the material will have a porosity of 8%. The porosity is made up of small evenly spaced apertures rather than large holes. Thus the porosity is generated by weaving the tapes so that there is some free space between the tapes, such that they are not butted up hard against each other as is the current practice.

By having a low porosity with the tapes butted up hard against each other, this leads to twisting during manufacture. This twisting and folding generates areas for dirt to collect. This reduces the light reflectivity and/or light transmission of the material or otherwise reduce the reflectivity or strength or life of the material.

By "reflective" in general is meant that the material is reflective of at least 50% of visible light on at least one side of the material.

Generally it is considered essential for ground cover materials to be either extruded film materials or tightly woven materials having minimal porosity, to effectively suppress weed growth and/or maximise light reflection from the upper surface of the material. The material of the invention may be formed so as to have acceptable reflectivity while the relatively high porosity of the material reduces the sail-effect of the material during windy periods as wind or air may pass through the more porous material, which reduces the mechanical loading on the fixing system which fixes the material in place and therefore reduces the likelihood of the material becoming dislodged and/or damage to the material and/or the fixing system. Additionally the more porous material allows more air movement between the ground and the air above the ground cover. Also with reflective ground covers there can be occasions where excessive moisture is beneath the material, which can be a disadvantage particularly when the material is laid between rows of trees or vines or plants, and tractor movement over the material occurs. Excessive soil moisture beneath the ground cover can lead to tractor wheel marking and soil compaction. With the more porous material of the invention water from irrigation or rainfall can pass more readily and rapidly through the ground cover material, so that ponding (or where water from rainfall or irrigation runs across the material to collect at the lower areas) of water on the material is reduced, which can result in uneven water distribution to the soil underneath the material. Typically sheet materials of the invention will be laid out in lengths on the ground between rows of the crop being grown, which may be trees, vines, bushes etc, to increase the amount of light to which the plants and in particular the fruit are exposed, by reflection of the light from the material back up towards the crop above, and the materials are referred to in the specification as "ground cover sheet materials". It is possible however that the materials may be suspended or positioned above the ground in a vertical or angled position to reflect the solar radiation onto the crop, for example on either side of the crop row, for example trees, and held in position by guy ropes or attached to wires that are positioned along the row direction or poles or a frame, and the expression "ground cover sheet material" is intended to encompass materials for such applications also.

BRIEF DESCRIPTION OF THE DRAWINGS

The invention is further described by way of example with reference to the accompanying drawings in which.

DETAILED DESCRIPTION OF THE DRAWINGS

Figure 1:
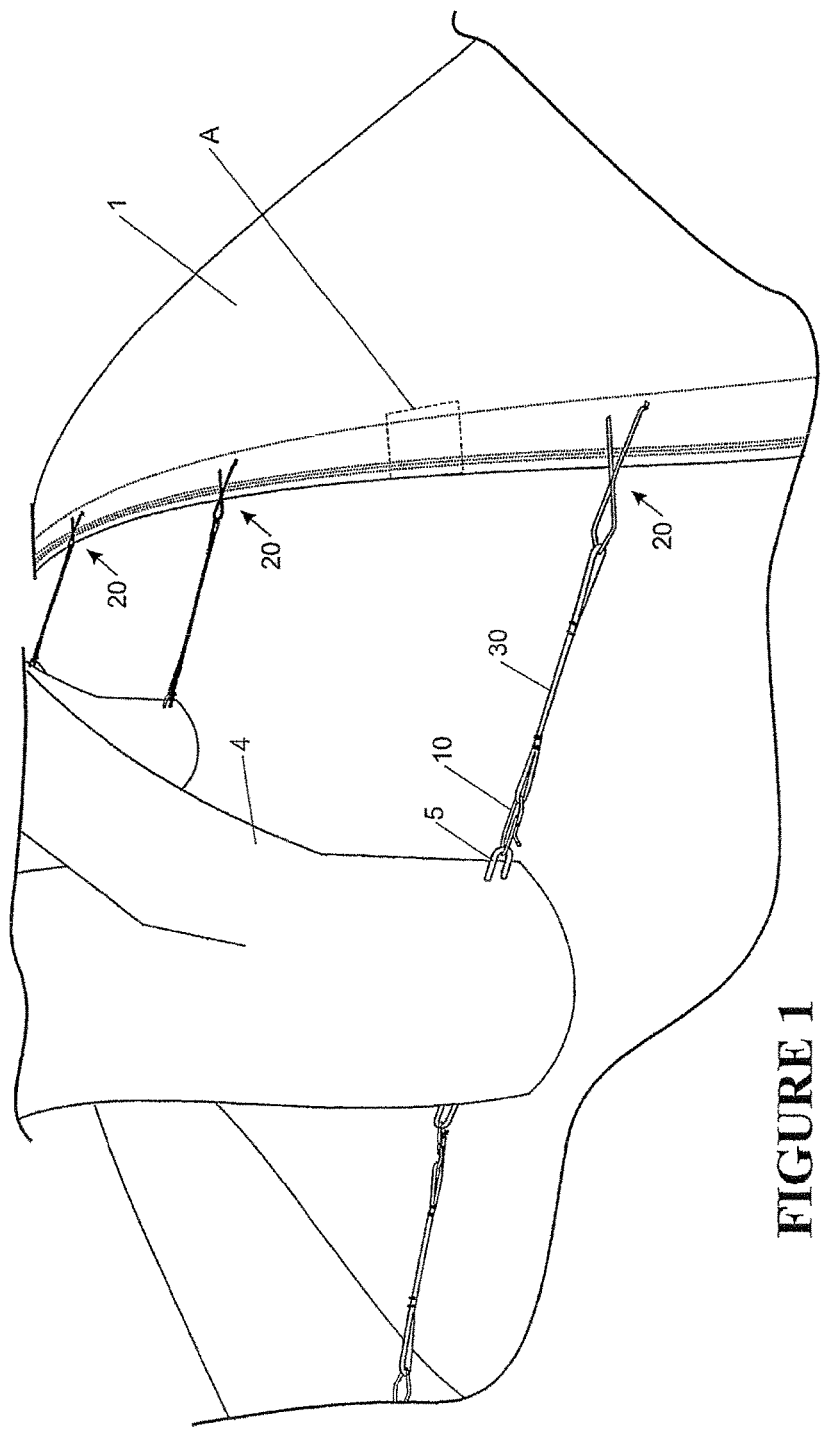
FIG. 1 shows use of a ground cover material and fixing of the ground cover material in place by the use of a claw and cord system, including a fastening component that penetrates the side margins of the material.

Referring to FIG. 1, agricultural sheeting 1 is anchored underneath agricultural crops such as rows of orchard trees 4 as a ground cover, which typically has reflective properties to reflect solar radiation onto the fruit trees and fruit from below. In FIG. 1 only part of the sheeting is shown. Typically long sections of the sheet material are anchored along both edges between rows of orchard trees or vines. The material is woven from flat warp and weft tapes of a plastics material. Fastening claws 20 connect to the sheeting along its edges, and in turn may connect to clips 10 usually by loops or lengths of extensible or optionally inextensible material 30. The clips 10 may in turn attach to staples 5 hammered into the spaced trees 4 as shown, or alternatively to stakes or pegs hammered into the ground, or to a wire extending along the row of the trees or vines, or to twine tied around the tree trunk or vine, for example.

Figure 2:
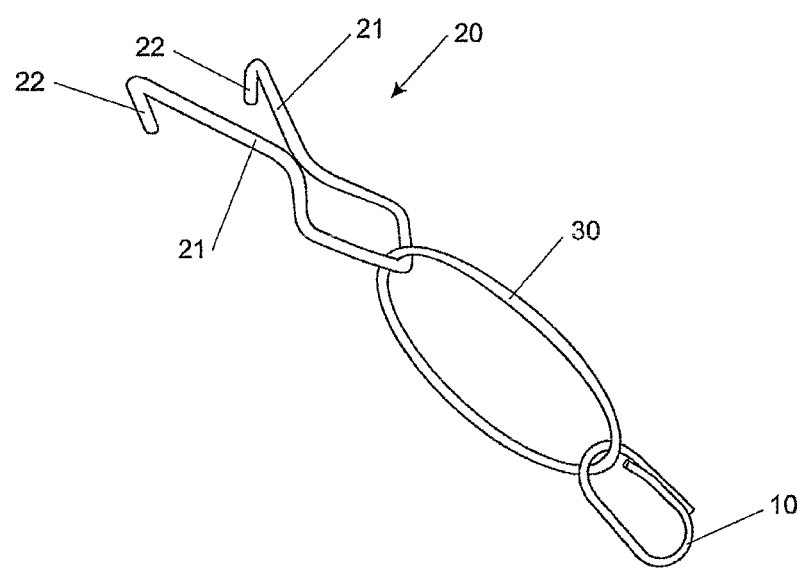
FIG. 2 shows a single fastening component.

By way of example one form of fastening claw 20 is shown in more detail in FIG. 2 and includes two arms 21 which extend to prongs 22 on either side, which prongs are in use forced through and pierce the sheeting 1. The fastening claws or equivalent fastening components may be of other forms however. The claw 20 and clip 10 are shown connected by a loop 30 of extensible or optionally inextensible material.

Figure 3:
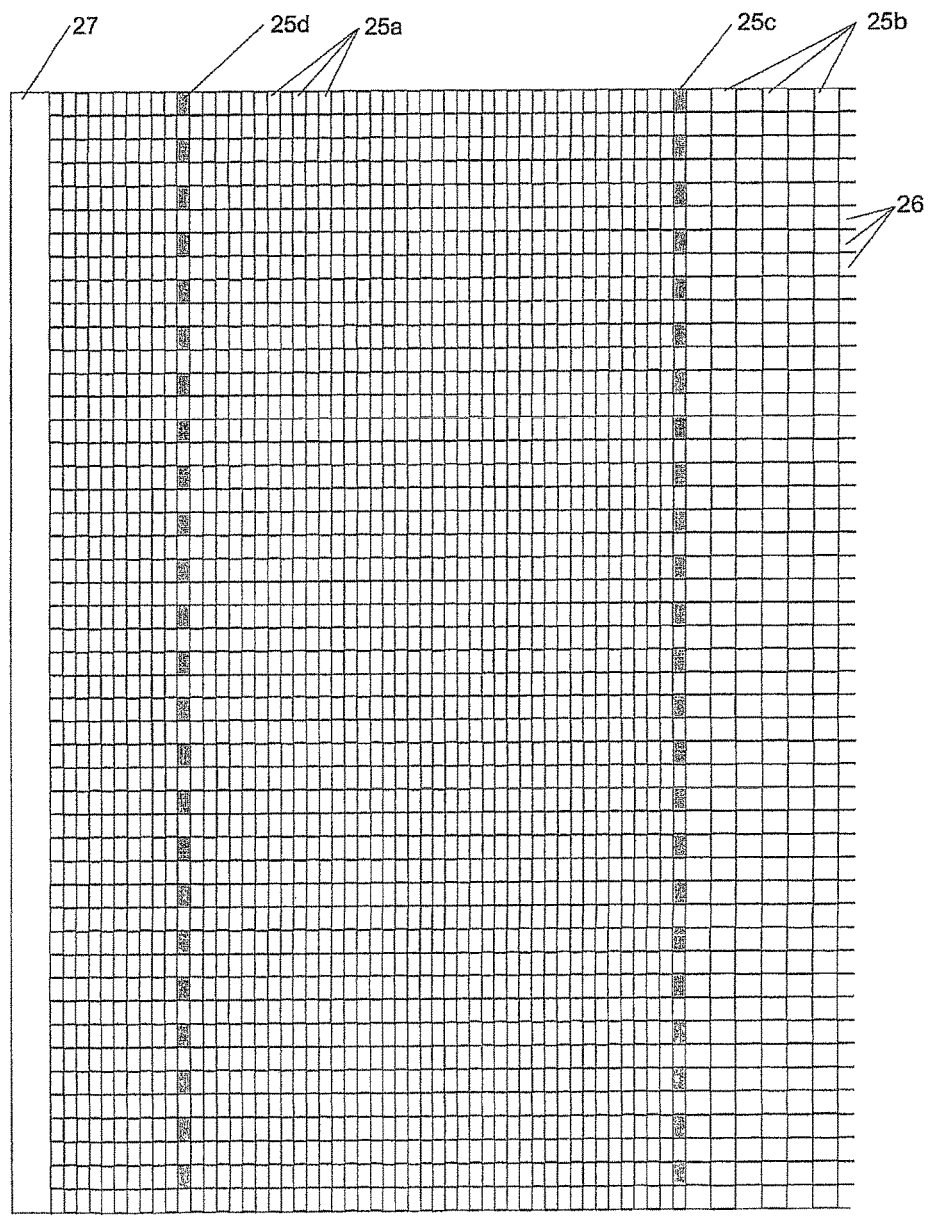
FIG. 3 shows a section of woven material according to one aspect of the invention.

FIG. 3 shows the side margin of one form of sheet material of the invention. The side margin area shown in FIG. 3 is the area A indicated and bounded by broken lines in FIG. 1. The sheet material is woven from longitudinally extending warp tapes 25a and 25b and transverse weft tapes 26. The tapes are flat plastic tapes either or both of which are formed from a polymer containing pigments which give the ground cover material the desired light reflective and transmissive properties. Typically the tapes are formed by extruding a film material from the polymer resin and then cutting the film into tapes which are in turn used to weave the woven material. The tapes from which the material is woven may be formed by any other suitable process however.

The warp tapes 25a towards the side edge 27 of the sheet material have a reduced width and higher number of warp tapes per unit area than the warp tapes 25b making up the balance of the sheet material. Typically the width of the warp tapes in the side margins of the material will be 20-80% of the width of the warp tapes of the balance of the material.

In a particularly preferred form the warp tapes 25a in the side margins of the material will be between 1 mm and 9 mm in width, while the other warp tapes 25b will be between 2 mm and 10 mm width. The weft tapes which extend transversely across the woven material are woven through both the wider warp tapes and the reduced width warp tapes at either side margin of the material. In some cases the reinforced margin may only be required on one side of the cover.

Preferably the width of the warp tapes is reduced so that the material has a higher density of warp tapes, in the side margin between the outer edge of the material generally parallel to the warp tapes to about 40 to 200 mm in from either side edge of the material towards the centre of the material.

The side margins of the material, in which the warp tapes are of reduced width and higher density, tend to be stronger than the balance of the material with the increased number of tape cross overs. When the sheet is fixed in place and using a fixing system including fastening components as shown in FIGS. 1 and 2 in which prongs or similar fastening components pierce through the side margins of the sheeting material, the increased strength of the side margins provides more secure fixing of the material, with reduced risk of tearing or enlargement of the holes formed when the prongs pierce through the material which increases risk of dislodgement of the prongs. At the same time the major part of the sheet material may be woven with warp tapes, and weft tapes, or a greater width than in these side margins, as may be desirable to optimise the reflective and transmissive properties of the material when the material is a reflective ground cover material for example, and/or to give more desired porosity properties. The wider tapes are more suited to give a higher porosity and less physical resistance or less friction to aid in the air, water, dirt and soil movement through the material.

In an alternative form the warp tapes 25a towards the side edge 27 of the sheet material may be of the same or a similar width to the warp tapes 25b making up the balance of the sheet material, but may be thicker. Typically the warp tapes in the side margins of the material will be 10 to 100% and preferably 10 to 50% thicker than the warp tapes of the balance of the material. Again this will strengthen the side margins of the material so that when the sheet is fixed in place using a fixing system including fastening components in which prongs or similar pierce through the side margins of the material, the increased strength of the side margins provides more secure fixing of the material, with reduced risk of tearing or enlargement of the holes formed when the prongs pierce through the material.

In a further alternative form the warp tapes 25a towards the side edges 27 of the sheet material may have both an increased thickness, and a reduced width and therefore a higher number of warp tapes per unit area, than the warp tapes 25b making up the balance of the sheet material.

In a further alternative form the warp tapes 25a may have a similar width as the warp tapes 25b but be woven with a tighter weave in side margins of the material relative to the weave between the side margins of the material, so that the material has a lower porosity in said side margins of the material than between the side margins of the material. The width & thickness of the tapes in the side margins of the material may be the same as in the centre section of the material but the tighter weave of the material in the side margins will give the side margins increased strength as referred to above.

Figure 4:
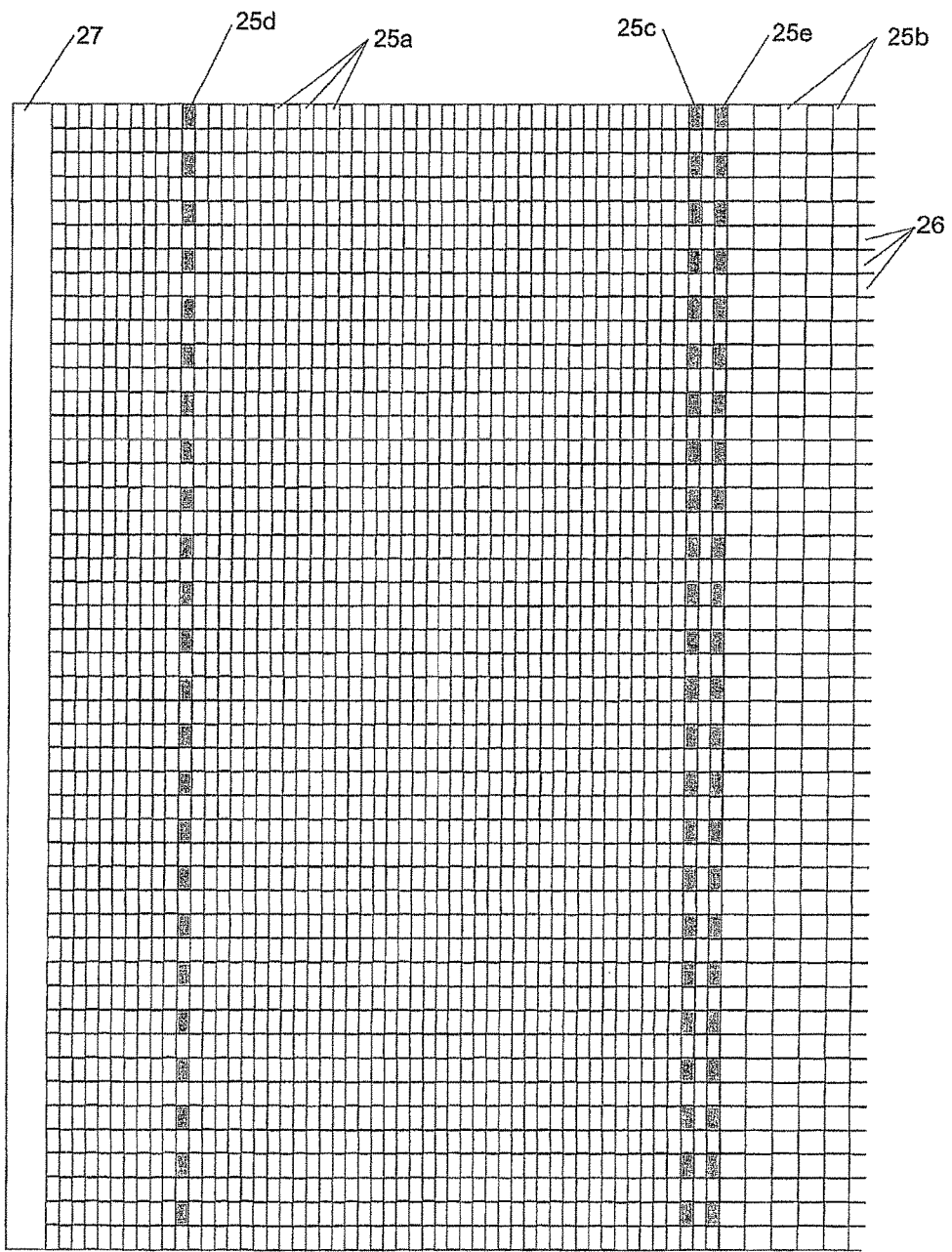
FIG. 4 shows a construction of the side margin of the material with a marker tape 40 mm in from the edge marking the start of the fastener attachment area and another marker tape 160 mm in from the edge marking the end of the fastener attachment area, and a batch marker tape.
Figure 5:
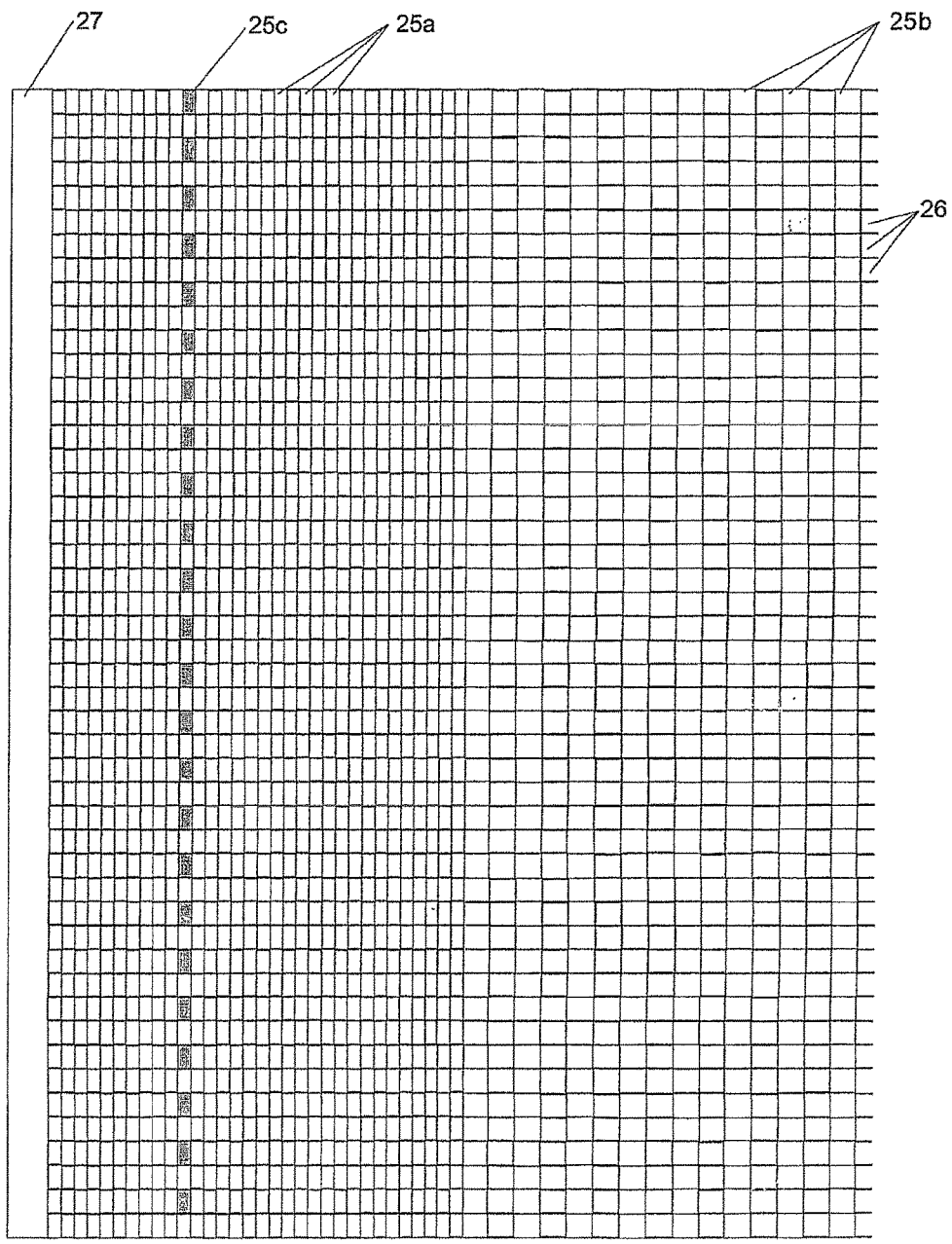
FIG. 5 shows another construction of the side margin of the material with a marker tape 40 mm in from the edge marking the fastener attachment area on either side of the marker tape depending on the fastener method.

In the preferred form a single warp tape 25c or a small number of adjacent warp tapes have a contrasting colour to the balance of the warp tapes 25 a and 25b, to mark one boundary of the stronger side margin of the material. This defines to a person installing the material the higher strength side margins of the material through which the fastening claws 20 should be inserted. Optionally a second contrasting colour warp tape or tapes 25 d may be provided closer to the edge 27 of the material, to define the other side of the strip extending longitudinally of the edge of the material through which the fastening claws should be inserted. It is not desirable to insert the fastening claw very close to the edge of the material or the fastening claw may pull through or damage the edge of the material. Tape 25d where provided may be positioned 20-60 mm for example 40 mm, from the edge 27 of the material, and tape or tapes 25c 150-200 mm and for example 160 mm from the edge 27 of the material. FIG. 4 is an example of a construction where marker tape 25d is 40 mm in from the edge 27, and then the next marker tape 25c is 160 mm from the edge 27 and a batch marker tape 25e is 5 mm from marker tape 25c (note the drawings are not to exact scale). Alternative to the warp tapes of contrasting colour a line or lines may be printed on the woven material after manufacture or alternatively a strip of a printed pattern or shading may be printed along the either longitudinal side margin of the material to again mark the strip through which it is desirable to insert the fastening components in use. Alternatively again the reduced width warp tapes in the side margins of the material may be formed of a contrasting colour to the balance of the material.

Where the material has a narrower width, of for example about 2.0 meters or less, it may be preferable to fix the material in place with the U-shaped staples which are inserted through the material in the ground, and in this case the first contrasting colour warp tape or tapes 25c may be positioned between 30 and 60 mm. FIG. 5 is an example of a construction where the marker tape 25c is 40 mm in from the edge 27. In this case the ground staple is placed in the area from the edge of the material 27 to the marker tape 25c, and for the case where a claw is used the prongs pierce in the area on the other side of marker tape 25c. The transition from warp tapes 25a to 25b occurs 60 to 160 mm from marker tape 25 c, preferably 60 mm.

Preferably woven materials of the invention are formed from tapes which have not been lengthwise folded or twisted during weaving, or minimally so (for example not more than one fold or twist per 1 m$^2$, more preferably 5 m$^2$, most preferably 10 m$^2$ and even more preferably 25 m$^2$ of material). It is common in the weaving of materials from synthetic tapes for the tapes to be folded lengthwise and crosswise during weaving. Increasing the porosity assists in reduction of folds or twists. As there are no folds for soil and dirt to lodge in and reduce the light reflectivity and/or light transmission of the material or otherwise reduce the reflectivity or strength or life of the material. The resulting reflective ground cover material has a very flat appearance without the folds.

Preferably woven materials of the invention are woven from tapes having a width of 3 mm or more preferably 3.5 mm or greater, or alternatively 4 mm or greater or more preferably 4.5 mm or greater, and most preferably between 3.5 mm and 4.5 mm in width (except that where the warp tapes in the side margins of the material are of reduced width to increase the side margin strength of the material, the side margin warp tapes such as the tapes 25a in FIG. 3 will have a reduced width). Materials formed of such wider tapes allow easier movement of air, water and soil particles through the material. Wider tapes tend to slide more easily over and away from each other than narrower tapes. (With narrower tapes there are more tape crossovers, this tends to give a tighter construction and the tapes are less prone to slide over each other). At the side margins the material may be woven with narrower warp tapes to give a tighter weave and stronger material at the side margins, so that when prongs of a fastening claw or similar device penetrate the material the hole(s) formed will not enlarge easily, to form a more secure connection. For the tapes in the main body of the material away from the edges, more movement in the tapes is acceptable as this movement is associated with more rapid air and water movement, and soil and dirt is less likely to lodge between the tapes where this movement occurs to maintain the reflective and transmission properties.

In another form of the invention the longitudinally extending opposite side margins of the ground cover material incorporate one or more agents which strengthen the side margins of the material relative to a longitudinal centre section of the material, or increase the resistance of said side margins of the material to strength degradation from exposure to the external environment and/or aging, relative to said longitudinal centre section of the material. Preferably said agent(s) include at least one light or heat stabiliser which will increase the resistance of the side margins of the material todegradation through exposure to solar radiation and temperature in an external environment, such as Irganox 245, Irganox 259, Irganox 565, Irganox 1010, Irganox 1035, Irganox 1076, Irganox 1098, Irganox 1135, Irganox 1141, Irganox 1330, Irganox 1425, Irganox 1520, Irganox 3052, Irganox 3114, Irganox 5057, Irganox MD 1024, Irgafos 168, Irgafos DDPP, Irgafos P-EPQ, Irgafos TNPP, IrgafosTPP, Irganox PS 800, Irganox PS 802, Irganox B 215, Irganox B 225, Irganox B 551, Irganox B 561, Irganox B 612, Irganox B 900, Irganox B 921, Irganox B 1171, Irganox B 3557, Irganox B 3596, Irganox HP 3560, Irganox HP 2215, Irganox HP 2225, Irganox HP 2921, Ca 100, Chimassorb 119, Chimassorb 944, Nor 371, Tinuvin 123, Tinuvin 144, Tinuvin 622, Tinuvin 765, Tinuvin 770, Tinuvin 783, Tinuvin 791, Chimassorb 81, Tinuvin 213, Tinuvin 234, Tinuvin 320, Tinuvin 326, Tinuvin 327, Tinuvin 328, Tinuvin 329, Tinuvin 350, Tinuvin 360, Tinuvin 492, Tinuvin 494, Tinuvin 571, Tinvin 622, Tinvin 765, Tinuvin 1577, Tinuvin P, Tinuvin B 75, Tinuvin B 241, MD 1024, Araldite 7072, AO-I, Ni-Quencher, TiO2 and Calcium Sterate. Additionally or alternatively said one or more agents include at least one agent which increases the strength of a plastic material from which the side margins are formed, such as the addition of strength enhancing polymers such as polyester, polypropylene, high density polyethylene, or linear low density polyethylene.

Said agent(s) may be incorporated in a resin from which the warp tapes of the side margins of the material are formed. Alternatively said agent(s) may be applied to the side margins of the material after forming, for example weaving, of the material. The agent(s) may for example be sprayed or otherwise overcoated onto the side margins of the material after manufacture of the material.

Figure 6:
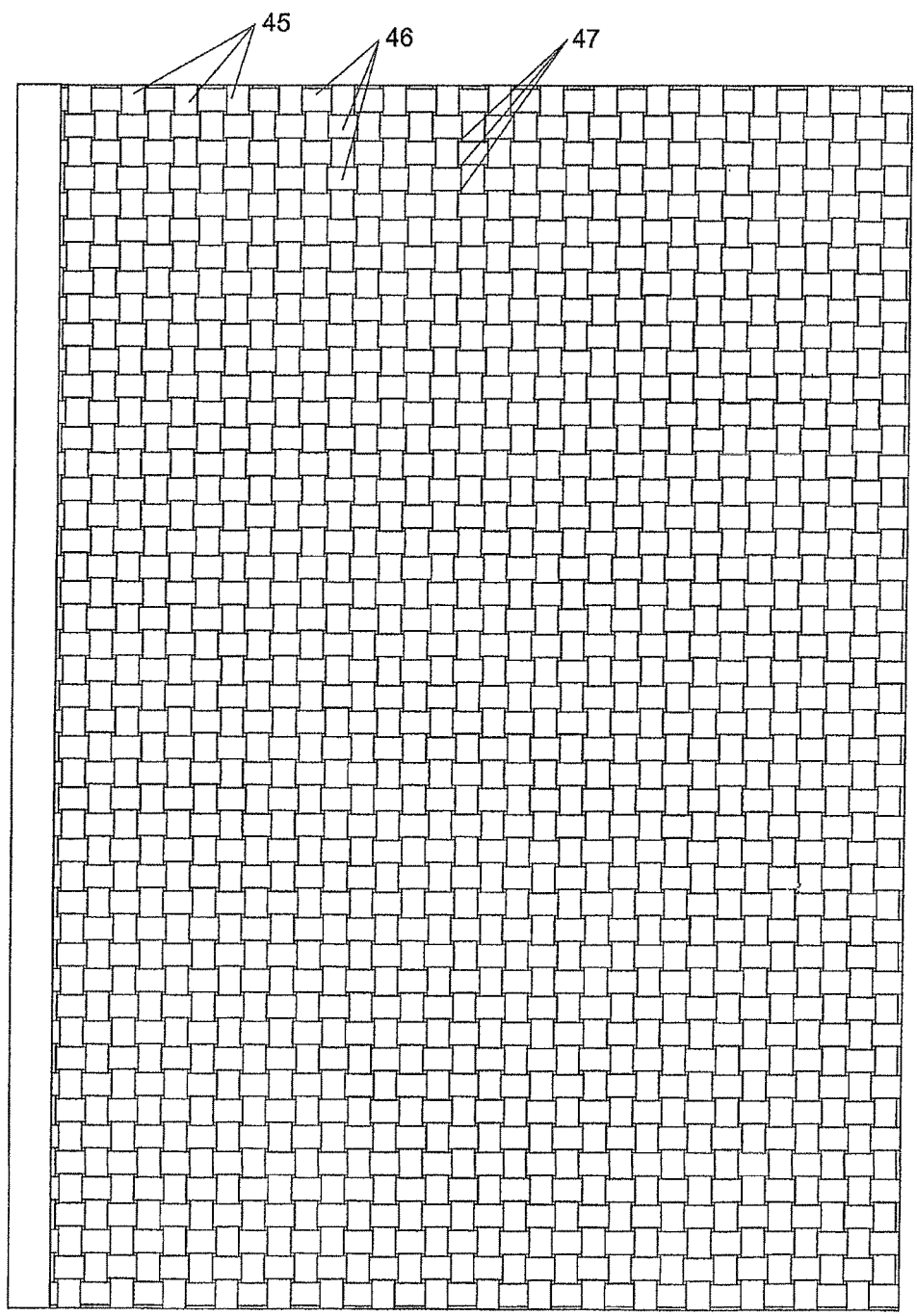
FIG. 6 shows a section of woven material according to another aspect of the invention.

Optionally the warp tapes in the side margins of the material may have different reflection or transmission properties from the warp tapes in the centre and major body of the material. For example the warp tapes in the side margins of the material may be more opaque, black, clear or otherwise have different reflection or transmission properties, without significantly compromising the overall effect or performance of the material, as the warp tapes in the side margins represent a relatively small percentage of the surface area of the material. FIG. 6 shows a further material according to the invention, which has increased porosity to reduce wind loading and increase air and water passage through the material. Again the material is a woven material, comprising warp tapes 45 and weft tapes 46. The warp and weft tapes are spaced apart from each other so that multiple air spaces 47 occur between the warp and weft tapes of the material, to give the material porosity relative to a conventionally tightly woven material. The material has a porosity of at least 2%, preferably up to 15%, more preferably 4-12%, even more preferably 5-10%, and most preferably 6-8%. Typically a ground cover needs properties across its width that vary, thus giving more strength at the edges and higher porosity at the centre. The invention details a method by which a material such as this can be created where previous materials have the same properties across the entire width.

Alternatively a woven or non-woven or extruded film material may be perforated, for example by needle punching or a similar process, after manufacture. Alternatively again the material may be formed as a non-woven synthetic material having the desired degree of porosity (whilst having similar properties of a known ground cover material).

Figure 7:
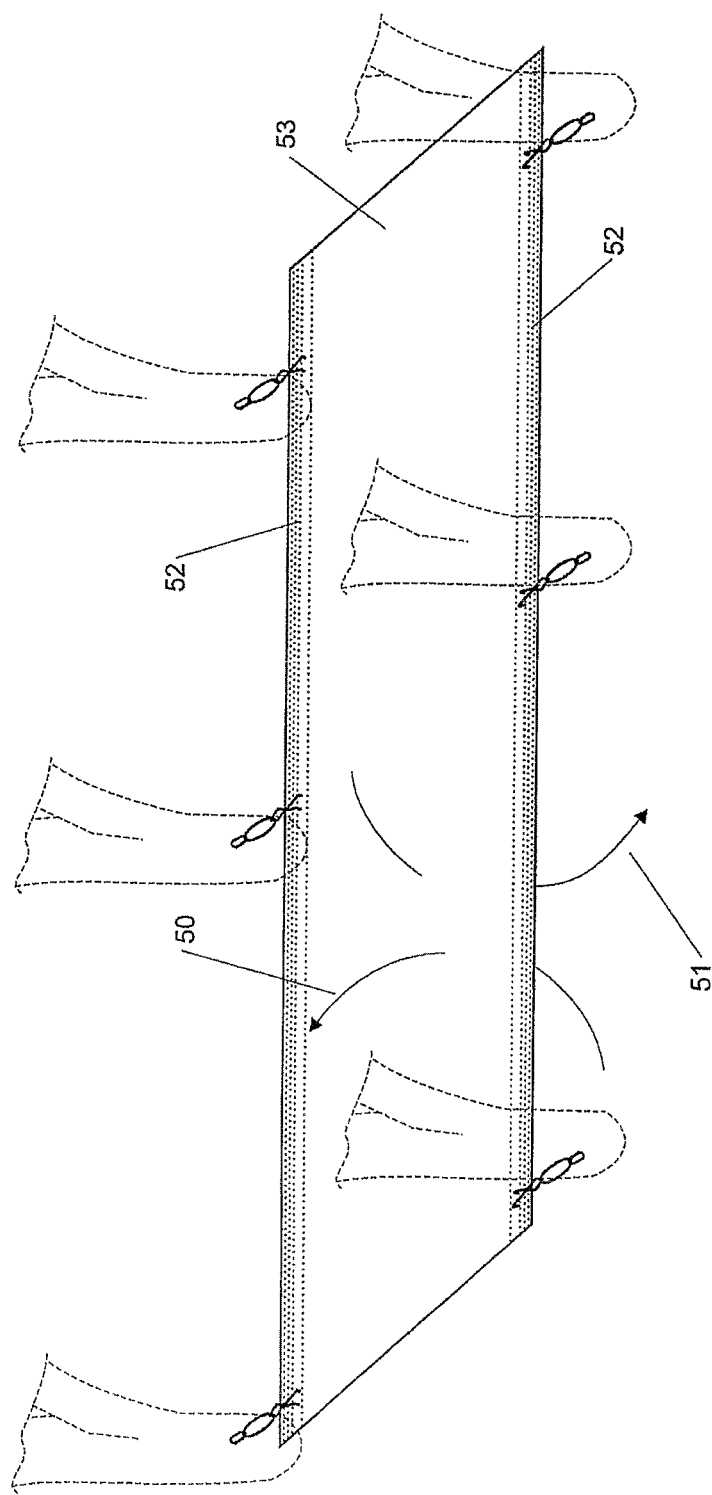
FIG. 7 shows use of a ground cover material according to another aspect of the invention between two rows of trees with an attachment system including fastening components which penetrate reinforced side margins of the material where there is extra strength and lower porosity relative to the central area of the material which has higher porosity.

Referring to FIG. 7, the material of the invention may be formed so as to have acceptable reflectivity while the relatively high porosity of the material reduces the sail-effect of the material under wind loading as wind or air may pass through the more porous material as indicated by arrows 50 and 51. This reduces the mechanical loading on the fixing system which fixes the material in place. It allows air and moisture movement between the ground and the air above the ground cover. It reduces excessive moisture beneath the material. Irrigation or rainfall water can pass more readily and rapidly through the ground cover material, so that ponding of water on the material is reduced, or water running across the material to collect in areas, which can result in uneven water distribution to the soil underneath the material. Also, soil and dirt can more easily pass through the material with this higher porosity. The areas indicated by 52 in FIG. 7 have a lower porosity to give the extra strength required where the material is fastened but the porosity of area 53 is at a suitably higher level. Ground cover materials may incorporate any one or more of the above aspects of the invention in combination. For example a ground cover material in which the side margins of the material are woven to have an increased density of warp tapes to strengthen the side margins of the material may also at least in the longitudinally extending centre section of the material be woven with a relatively looser or more open weave so that the material has higher porosity, or perforated to give the material a high porosity.

Optionally also in the same material the side margins of the material and for example the warp tapes may be formed from a plastics resin which incorporates one or more pigments of agents which give the side margins of the material a higher strength, a higher resistance to solar radiation or heat degradation, and so forth.

The foregoing describes the invention including a preferred form thereof, alterations and modifications as will be obvious to those skilled in the art are intended to be incorporated in the scope hereof as defined in the accompanying claims.

The invention claimed is:

1. A reflective woven ground cover sheet material woven from warp and weft tapes, the material comprising longitudinally extending opposite side margins and a longitudinally extending center section between the longitudinally extending side margins of the material, in which the width of all of the warp tapes is reduced in the longitudinally extending opposite side margins of the material relative to the width of warp tapes in the longitudinally extending center section of the material, and in which said longitudinally extending opposite side margins of the sheet material have a lower porosity than said longitudinally extending center section between said side margins of the material, and which the material is reflective of at least 50% of visible light on at least one side of the material.

2. A reflective woven ground cover sheet material as claimed in claim 1 in which a thickness of warp tapes is increased in the longitudinally extending side margins of the material relative to the thickness of warp tapes in the longitudinally extending center section.

3. A reflective woven ground cover sheet material as claimed in claim 1 in which a chemical composition of warp tapes in the longitudinally extending opposite side margins of the material is different to that of warp tapes in the longitudinally extending center section to strengthen the side margins of the material relative to the longitudinally extending center section of the material, or to increase the resistance of the side margins of the material to strength degradation from exposure to the external environment and/or aging, relative to said longitudinal center section of the material.

4. A reflective woven ground cover sheet material as claimed in claim 1 in which the longitudinally extending opposite side margins of the material have had applied thereto one or more agents to strengthen the side margins of the material relative to the longitudinally extending center section of the material, or to increase the resistance of the side margins of the material to strength degradation from exposure to the external environment and/or aging, relative to said longitudinal center section of the material.

5. A reflective woven ground cover sheet material as claimed in claim 1 in which said side margins extend up to about 300 mm in from respective opposite side edges of the material.

6. A reflective woven ground cover sheet material as claimed in claim 1 in which said side margins extend up to about 200 mm in from respective opposite side edges of the material.

7. A reflective woven ground cover sheet material as claimed in claim 1 in which the warp tapes in said side margins have a width between about 1 and about 3 mm and the warp tapes in the balance of the sheet material have a width between about 3 and about 5 mm.

8. A reflective woven ground cover sheet material as claimed in claim 1 in which the warp and weft tapes are unfolded or untwisted along a length thereof, or are folded or twisted minimally along a length thereof, so that there is not more than one fold or twist per 10 m$^2$ surface area of the material at least in said center section of the material.

9. A reflective woven ground cover sheet material as claimed in claim 1 woven from warp tapes and weft tapes and wherein the warp and weft tapes are flat.

10. A reflective woven ground cover sheet material as claimed in claim 1 woven from warp tapes and weft tapes of a plastics material.

11. A reflective woven ground cover sheet material as claimed in claim 1 in which the transition between an inner edge of each said side margin and said center section of the material is marked by a line or other marking of contrasting colour.

12. A reflective woven ground cover sheet material as claimed in claim 1 in which the colour of all of the warp tapes in said side margins contrasts to that of the balance of the sheet material.

13. A reflective woven ground cover sheet material as claimed in claim 1 having a porosity of at least 2%.

14. A reflective woven ground cover sheet material as claimed in claim 1 having a porosity of 2 to 15%.

15. A reflective woven ground cover sheet material as claimed in claim 1 which has a width across a longitudinal axis of said center section which is greater than the combined widths of the two said longitudinally extending opposite side margins of the material.

16. A reflective woven ground cover sheet material woven from warp and weft tapes, said ground cover sheet material comprising longitudinally extending opposite side margins located adjacent to longitudinally extending opposite edges of the material, and comprising a different construction in the longitudinally extending opposite side margins of the material than in a longitudinally extending center section between the side margins of the material, said different construction comprising warp tapes having a reduced width in the longitudinally extending opposite side margins of the material relative to the width of warp tapes in the longitudinally extending center section between the side margins of the material and said longitudinally extending opposite side margins of the sheet material having a lower porosity than the longitudinally extending center section between the side margins of the material, the width of the center section being greater than the combined widths of the longitudinally extending opposite side margins of the material.

17. A reflective woven ground cover sheet material as claimed in claim 16 in which the transition between an inner edge of each said side margin and said center section of the material is marked by a line or other marking of contrasting color.

18. A reflective woven ground cover sheet material as claimed in claim 16 in which the color of all of the warp tapes in said side margins contrasts to that of the balance of the sheet material.

19. A reflective woven ground cover sheet material woven from longitudinally extending warp tapes and transversely extending weft tapes, and comprising in longitudinally extending opposite side margins of the material more longitudinally extending warp tapes per unit measurement of width of the material across a longitudinal axis of the material, than in a longitudinally extending center section between the side margins of the material, the width of the center section being greater than the combined widths of the longitudinally extending opposite side margins of the material.

20. A reflective woven ground cover sheet material as claimed in claim 19 in which said side margins extend up to about 300 mm in from respective opposite side edges of the material.

21. A reflective woven ground cover sheet material as claimed in claim 19 in which the warp and weft tapes are unfolded or untwisted along a length thereof, or are folded or twisted minimally along a length thereof so that there is not more than one fold or twist per 10 m$^2$ surface area of the material at least in the center section of the material.

22. A reflective woven ground cover sheet material as claimed in claim 19 wherein the warp and weft tapes are flat.

23. A reflective woven ground cover sheet material as claimed in claim 19 wherein at least said center section of the material on at least one side of the sheet is reflective of at least 50% of visible light.

24. A reflective woven ground cover sheet material as claimed in claim 19 in which the transition between an inner edge of each said side margin and said center section of the material is marked by a line or other marking of contrasting color.

25. A reflective woven ground cover sheet material as claimed in claim 19 in which the color of all of the warp tapes in said side margins contrasts to that of the balance of the sheet material.

26. A reflective woven ground cover sheet material woven from warp and weft tapes, the material comprising longitudinally extending opposite side margins and a longitudinally extending center section between the longitudinally extending side margins of the material, in which the width of all of the warp tapes is reduced in the longitudinally extending opposite side margins of the material relative to the width of warp tapes in the longitudinally extending center section of the material, and which said longitudinally extending opposite side margins of the sheet material have a lower porosity than said longitudinally extending center section between said side margins of the material.

* * * * *